United States Patent [19]
Ohmori

[11] Patent Number: 5,330,270
[45] Date of Patent: Jul. 19, 1994

[54] STATICALLY PRESSURE BALANCED SLIDE UNIT

[75] Inventor: Yoshiki Ohmori, Ohmuta, Japan

[73] Assignee: Nippon Thompson Co., Ltd., Japan

[21] Appl. No.: 22,251

[22] Filed: Feb. 24, 1993

[30] Foreign Application Priority Data

Feb. 24, 1992 [JP] Japan .................................. 4-072857

[51] Int. Cl.⁵ .............................................. F16C 32/06
[52] U.S. Cl. .......................................... 384/8; 384/37; 384/12
[58] Field of Search ................... 384/8, 12, 37, 42, 98, 384/17

[56] References Cited

U.S. PATENT DOCUMENTS

| | | | |
|---|---|---|---|
| 3,484,064 | 12/1969 | Koenig | 384/37 |
| 4,978,233 | 12/1990 | Stötzel et al. | 384/12 |
| 5,064,318 | 11/1991 | Ciritto | 384/12 |
| 5,228,378 | 7/1993 | Bathory | 384/12 |

Primary Examiner—Lenard A. Footland
Attorney, Agent, or Firm—Skjerven, Morrill, MacPherson, Franklin & Friel

[57] ABSTRACT

A static pressure slide unit includes a guide rail, two-part slider slidably mounted on the guide rail and having a slider main body and a slider pressure member, and a mechanism interposed between the slider main body and the slider pressure member for constantly urging the slider pressure member against the guide rail. A pressurized fluid supplying system is also provided for supplying a gas or liquid under pressure to a sliding contact interface between the guide rail and the slider.

9 Claims, 5 Drawing Sheets

STATICALLY PRESSURE BALANCED SLIDE UNIT

BACKGROUND OF THE INVENTION

1. Field of the Invention

This invention generally relates to a slide unit including a rail and a slider slidably mounted on the rail to provide a slide motion therebetween, and, in particular, to a statically pressure balanced slide unit in which a static pressure between the rail and the slider is maintained at a predetermined level.

2. Description of the Prior Art

A static pressure slide unit is well known in the art as described in the Japanese Utility Model Post-exam Pub. No. 63-48810. The slide unit described in this publication is schematically shown in FIGS. 7 and 8 of this application. As shown, the slide unit of this publication includes a table guide 30 having a rectangular cross section and a moving table 31 having a annular, rectangular cross section, which is fitted onto the guide 30 with a minute gap 32 therebetween. Pressurized air is introduced into the gap 32 via an air hose 33 and/or 34 so as to support the moving table 31 to which an external load is applied by means of the static pressure of the fluid in the gap 32.

However, in the above-described slide unit, the table guide 30 has four fixed, flat guide surfaces, i.e., flat top 35, bottom 37 and side 36, 38 surfaces, and the slider 31 also has four fixed, flat guide surfaces, i.e., flat top 39, bottom 41 and side 40, 42 surfaces, located opposite to the guide surfaces 35, 37, 36 and 38, respectively. As indicated by the arrows in FIG. 8, static pressure is applied to the gap 32 in a direction normal to each of the guide surfaces 35-38 and 39-42.

Under the condition, in order to maintain the static pressure in the gap 32 in a desired range, each of the guide surfaces 35-42 must be finished to a predetermined precision, which requires to use a high precision processing and assembly which, in turn, tends to push up the manufacturing cost. In addition, in the above-described slide unit, when a load F is applied to the table 31 as shown in FIG. 11, the table 31 is pushed downward so that a portion 32A of the gap 32 where load F has been applied decreases and its opposite portion 32B of the gap 32 increases. If the gap increases locally in this manner, there occurs an increased leakage of pressurized air, so that the static pressure inside the gap 32 cannot be maintained at a desired high level. In the case of FIG. 11, the table 31 is eventually shifted in a new position where the static pressure inside the gap 32 is balanced with the load F; however, the static pressure inside the gap 32 is not stabilized momentarily. It takes a finite period of time for the static pressure to settle and the table 31 to settle to its new balanced position. Such a period of time will be referred to as an unstable period here. The conventional slide unit notably has a relaively large unstable period. It is true that use may be made of an automatically adjustable static pressure bearing as well known in the art so as to alleviate or remove such a problem, but the overall structure tends to become bulky and the cost tends to increase.

If a load F is applied at one end of the table 31 as shown in FIG. 12, the table 31 becomes inclined with respect to the rail 30, thereby creating increased gap portions 32D and 32E and decreased gap portions 32C and 32F. In this case also, the table 31 is shifted in position until a balance is obtained between the load F and the static pressure inside the gap 32. Thus, there is also a relatively large unstable period.

The larger the static pressure inside the gap 32, the smaller the amount of displacement of the table 31 until its new stable position is reached. However, in order to set the static pressure inside the gap 32 at a higher level, the width of the gap 32 must be set smaller, which requires to process guide surfaces 35-38 and 39-42 more accurately, which, in turn, pushes up the manufacturing cost.

As set forth above, the conventional static pressure slide unit has disadvantages of relatively large unstable period, incapability to maintain a relatively high static pressure and low rigidity. Therefore, there has been a need to develop a novel static pressure slide unit which are free of the disadvantages of the prior art as described above.

SUMMARY OF THE INVENTION

In accordance with the present invention, there is provided a static pressure slide unit comprising: a guide rail, having a pair of oppositely inclined first and second top surfaces and a pair of oppositely inclined first and second bottom surfaces, and a two-part slider slidably mounted on the rail and including a slider main body having a pair of oppositely inclined third and fourth top surfaces in slinding contact with the first and second top surfaces of the guide rail, respectively, and a slider pressure member having a pair of oppositely inclined third and fourth bottom surfaces in sliding contact with the first and second bottom surfaces of the guide rail and mounted on the slider main body so as to be movable closer to or away from the guide rail. The slide unit also comprises means for urging the slider pressure member against the guide rail and means for supplying a pressurized fluid to the sliding contact between the guide rail and the slider.

In a preferred embodiment, the guide rail has a symmetrical cross section with respect to its vertical center line. More preferably, the cross section of the guide rail is also symmetrical in shape with respect to its horizontal center line. In one embodiment, the guide rail has a cross section in the shape of a rhomboid. Preferably, the cross section is square in shape.

In one embodiment, the urging means includes a spring interposed between the slider main body and the slider pressure member. The urging means preferably includes an adjusting member, such as a screw, for varyingly set the spring force acting between the guide rail and the pressure member. Alternatively, the urging means includes a piston and a cylinder structure interposed between the slider main body and the slider pressure member, whereby a fluid under pressure is supplied to a chamber defined between the cylinder and the piston to thereby cause the pressure member to be pressed against the guide rail.

It is therefore a primary object of the present invention to provide an improved static pressure type slide unit.

Another object of the present invention is to provide a static pressure slide unit easy to manufacture and thus low at cost.

A further object of the present invention is to provide a static pressure slide unit fast in response and thus extremely small in its unstable period.

A still further object of the present invention is to provide a static pressure slide unit high in rigidity and thus capable of maintaining a relatively high static pressure.

Other objects, advantages and novel features of the present invention will become apparent from the following detailed description of the invention when considered in conjunction with the accompanying drawings.

DESCRIPTION OF PREFERRED EMBODIMENTS

Figure 1:
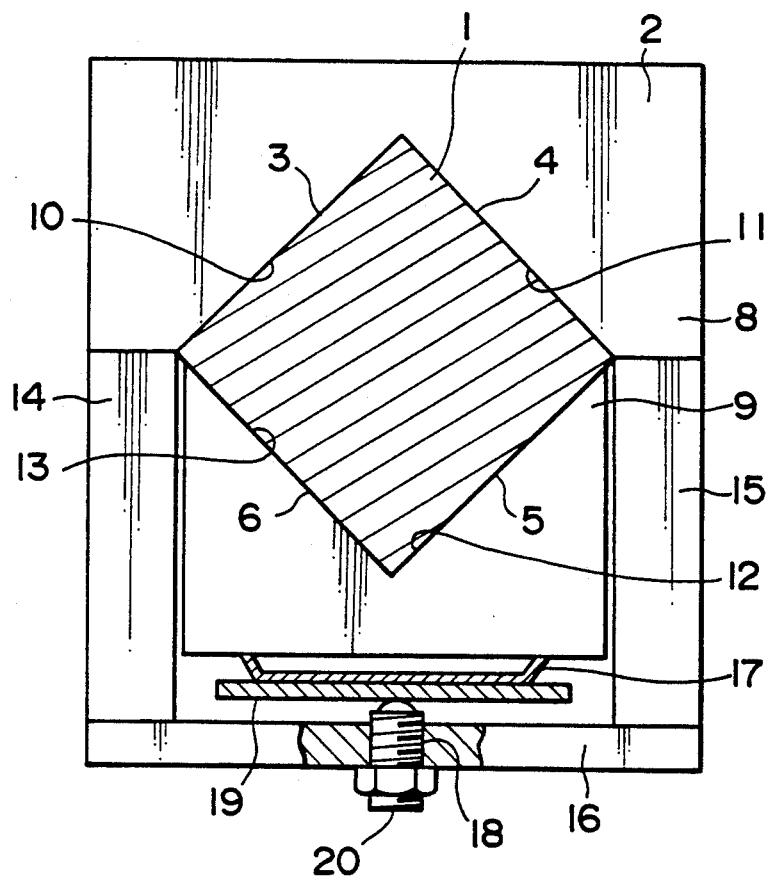
FIG. 1 is a schematic illustration showing in transverse cross section a static pressure slide unit constructed in accordance with one embodiment of the present invention.
Figure 2:
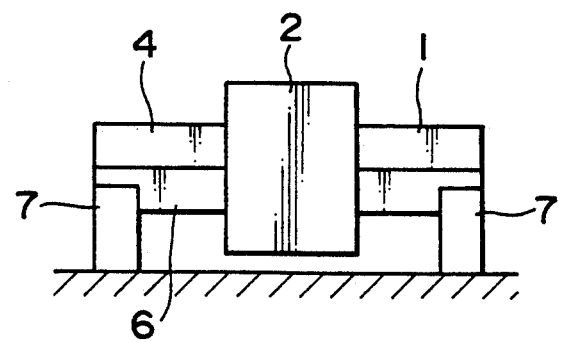
FIG. 2 is a schematic illustration showing in side elevation the slide unit of FIG. 1.

Referring now to FIGS. 1 and 2, there is schematically shown a static pressure slide unit constructed in accordance with one embodiment of the present invention. As shown, the present static pressure guide unit includes an elongated guide rail 1 in the shape of a rod and a slider 2 which is slidably mounted on the guide rail 1. The guide rail 1 has a polygon-shaped cross section such as a rhomboid or a square in the case of an illustrated embodiment. In the illustrated embodiment, the guide rail 1 has a square cross section and thus it has a pair of oppositely inclined first and second top guide surfaces 3 and 4 and a pair of oppositely inclined first and second bottom guide surfaces 5 and 6. Each of these guide surfaces 3 through 6 is preferably a flat surface, though it may be somewhat curved, if desired.

As shown in FIG. 2, the guide rail 1 is supported at its both ends by support members 7, such as V blocks, so that it is located above a mounting surface in the form of a bridge. As best shown in FIG. 1, the slider 1 has a two-part structure, including a slider main body 8 and a slider pressure member 9. The slider main body 8 is formed with a pair of oppositely inclined third and fourth top guide surfaces 10 and 11 in an opposed relationship with the corresponding pair of first and second top guide surfaces 3 and 4, respectively. The slider main body 2 includes a pair of side plates 14 and 15 which extend downward from the opposite sides and also a bottom plate 16 which extends horizontally and is fixedly attached to the bottom ends of the side plates 14 and 15, thereby defining a chamber. Although not shown specifically, the slider main body 2 also preferably includes an end plate at each end thereof.

The slider pressure member 9 is disposed inside the chamber defined by the side plates 14, 15 and bottom plate 16 such that it may move up and down within the chamber. A predetermined gap may be provided between the pressure member 9 and each of the side plates 14 and 15 for this purpose, or, alternatively, any engaging means, such as a combination of a ridge and a recess, may be provided between the pressure member 9 and the side plates 14 and 15 so as to guide a relative vertical motion between the pressure member 9 and the side plates 14 and 15. The pressure member 9 is formed with a pair of oppositely inclined third and fourth guide surfaces 12 and 13 in an opposed relationship with the associated first and second bottom guide surfaces 5 and 6 of the guide rail 1, respectively.

Also provided in contact with the bottom surface of the pressure member 9 in the present slide unit is a leaf spring 17 serving as an urging means for urging the pressure member 9 against the guide rail 1. The leaf spring 17 is seated on a support plate 19 which sits on top of a pressure adjusting screw 20 threaded into a threaded hole 18 provided in the bottom plate 16. In the illustrated embodiment, the screw 20 has a rounded tip end which is in contact with the bottom surface of the support plate 19. Thus, depending on the direction of rotation, the screw 20 moves upward or downward to thereby adjust the urging force to be applied to the pressure member by means of the leaf spring 17. Although not shown specifically, it is to be noted that the leaf spring 17 is fixedly attached to the support plate 19 by any desired means, such as rivets. Incidentally, if desired, use may be made of one or more JISB (Japanese Industrial Standards B) springs.

Figure 6:
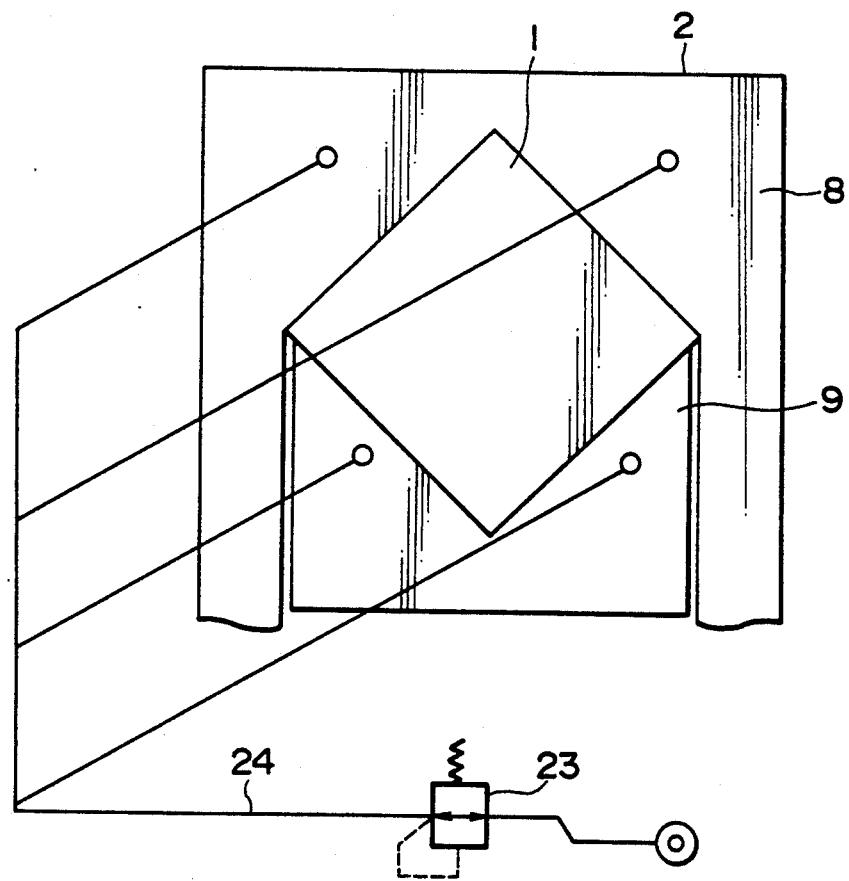
FIG. 6 is a schematic illustration showing a system for supplying a pressurized fluid to the sliding contact or gap between the guide rail and the slider in accordance with one embodiment of the present invention.
Figure 7:
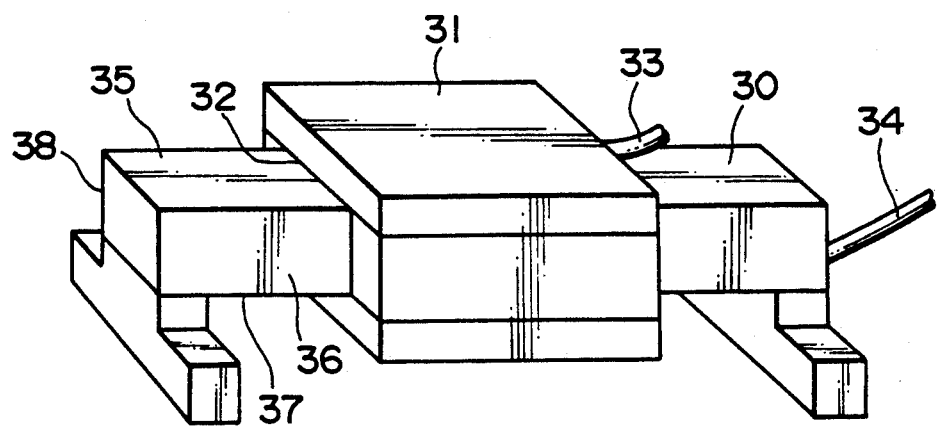
FIG. 7 is a schematic illustration showing in perspective view a prior art static pressure slide unit.
Figure 8:
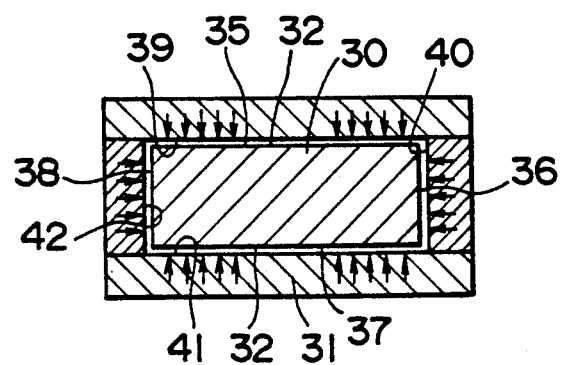
FIG. 8 is a schematic illustration showing the transverse cross section of the slide unit shown in FIG. 7.

As shown in FIG. 6, a pressurized fluid supplying line system 24 extends from a supply source to each of the slider main body 8 and slider pressure member 9 via a pressure adjusting valve 23. Thus, a pressurized fluid is supplied to a gap or contact between any two opposed guide surfaces 3-10, 4-11, 5-12 and 6-13 of the guide rail 1 and the slider 2 so that the slider 2 is slidably supported on the guide rail 1 with a film of pressurized fluid therebetween. The pressure adjusting valve 23 may be suitably adjusted to maintain the static pressure of the fluid sandwiched between the guide rail 1 and the slider 2.

Figure 10:
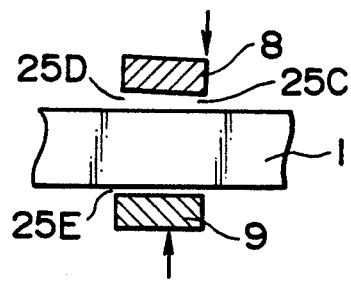
FIG. 10 is an illustration useful for explaining the operation of the present slide unit when a load has been applied off-centered.

As described above, since the slider pressure member 9 is in engagement with the slider main body 8 through the support plate 19 and the leaf spring 17, even if a load F were applied at one end of the slider main body 8 as shown in FIG. 10 to cause the slider main body 8 to be inclined with respect to the guide rail 1, thereby making a right-hand gap 25C smaller than a left-hand gap 25D, the slider pressure member 9 would not be inclined with respect to the guide rail 1 and thus a uniform gap is maintained all across a gap 25E between the guide surfaces 5 and 6 of the guide rail 1 and the associated guide surfaces 12 and 13 of the slider pressure member 9.

Figure 9:
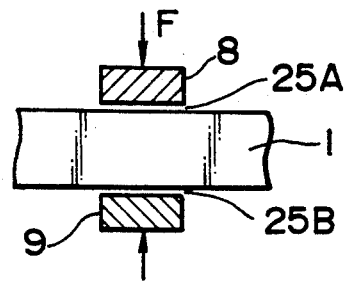
FIG. 9 is an illustration useful for explaining the operation of the present slide unit when a load has been applied at its center.

In addition, as described above, since a preselected preloading force is applied between the guide rail 1 and the slider 2 by means of the leaf spring 17 serving as an urging means, even if a load F were applied externally to the slider main body 8 as shown in FIG. 9 to thereby cause a gap portion 25A between the guide rail 1 and the slider main body 8 to become smaller, a gap portion 25B between the guide rail 1 and the slider main body 9 would remain unchanged at all times because the slider pressure member 9 is normally urged against the guide rail 1 by means of the urging means 17. Thus, the gap portions 25A and 25B are functionally separated and not associated in the present embodiment.

Figure 11:
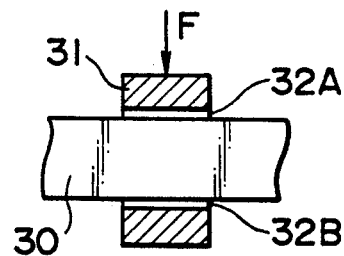
FIG. 11 is an illustration useful for explaining the operation of the conventional slide unit when a load has been applied at its center.
Figure 12:
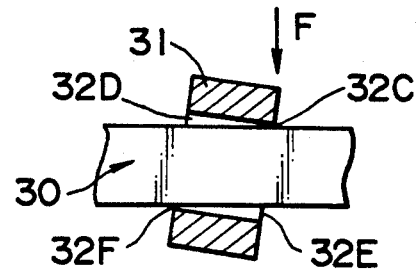
FIG. 12 is an illustration useful for explaining the operation of the conventional slide unit when a load has been applied off-centered.

In the conventional static pressure slide unit, when a load F were applied externally as shown in FIG. 11, the gap portion 32A would decrease and on the other hand the gap portion 32B would increase in association therewith. As a result, the static pressure inside the gap between the guide unit 1 and the table 31 would fluctuate. Because of this instability, a high static pressure cannot be maintained in the gap of the conventional slide unit. Furthermore, since the static pressure is relatively lower in the conventional structure, a relatively large amount of displacement occurs between the guide rail 30 and the table 31, which tends to degrade the rigidity as a slide unit.

On the other hand, in the present slide unit, it is so structured that the gap portion 25B would change very little even if a change occurred in the gap portion 25A because of application of an external force F. As a result, the movement of slider 8 closer to and/or separated away from the guide unit 1 is significantly reduced. In this manner, since the static pressure in the gap between the guide unit 1 and the slider 8 can be restored to its intended level rapidly even if a change occurred in the static pressure, for example, due to application of an external force, the unstable period is extremely small in the present embodiment.

Figure 5:
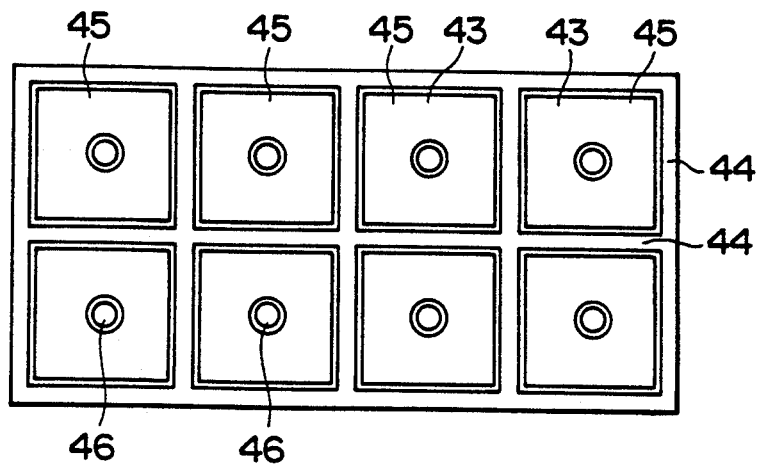
FIG. 5 is a schematic illustration showing in plan view a structure for distributing a pressurized fluid over a selected area of the sliding contact or gap between the guide rail and the slider.

In a preferred embodiment, each of the guide surfaces 10 through 13 of the slider 8 is substantially a flat surface and partitioned into a plurality of functional sections 43 as shown in FIG. 5. In the embodiment shown in FIG. 5, the guide surface 10, 11, 12 or 13 is partitioned into eight functional sections 43. In the structure shown in FIG. 5, a grid-shaped guide surface 44 is formed to define eight static pressure recesses 45, each square in shape in the illustrated embodiment and in communication with a static pressure port 46 through which a pressurized fluid is supplied. It is to be noted, however, that the guide surfaces 10–13 may have any other structure, if desired.

Figure 3:
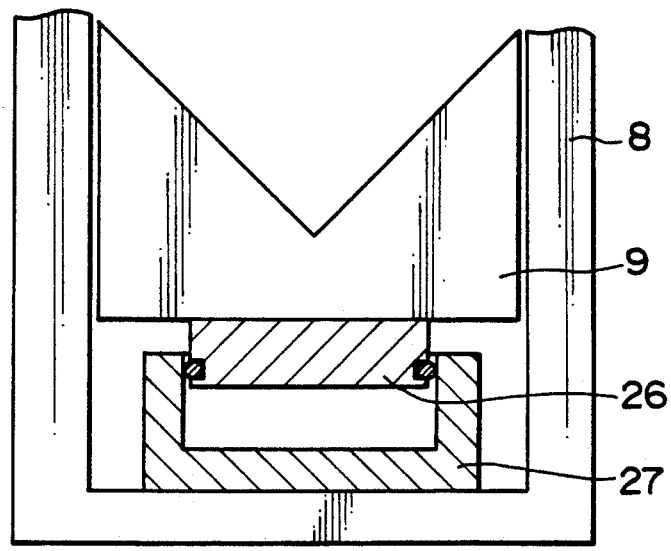
FIG. 3 is a schematic illustration showing in transverse cross section part of a static pressure slide unit constructed in accordance with another embodiment of the present invention.

FIG. 3 illustrates a portion of a static pressure slide unit constructed in accordance with another embodiment of the present invention. As shown, this embodiment is similar in many respects to the above-described first embodiment excepting its urging mechanism for urging the pressure member against the guide rail 1 (not shown), and, therefore, there is only shown those portions which differ in structure from the previously described embodiment. As shown in FIG. 3, use is made of a piston and cylinder mechanism as an urging means in this embodiment. That is, in this embodiment, a piston 26 is fixedly attached to the pressure member 9 and a cylinder 27 is fixedly attached to the slider main body 27. The piston 26 is slidably fitted into the cylinder and thus the piston 26 may move relative to the cylinder in either direction depending on the level of the pressure of fluid inside a chamber defined between the cylinder 27 and the piston 26. With this structure, a pressurized fluid is supplied into the chamber between the piston 26 and the cylinder 27 so as to apply a preloading force between the guide rail 1 and the slider 2.

Figure 4:
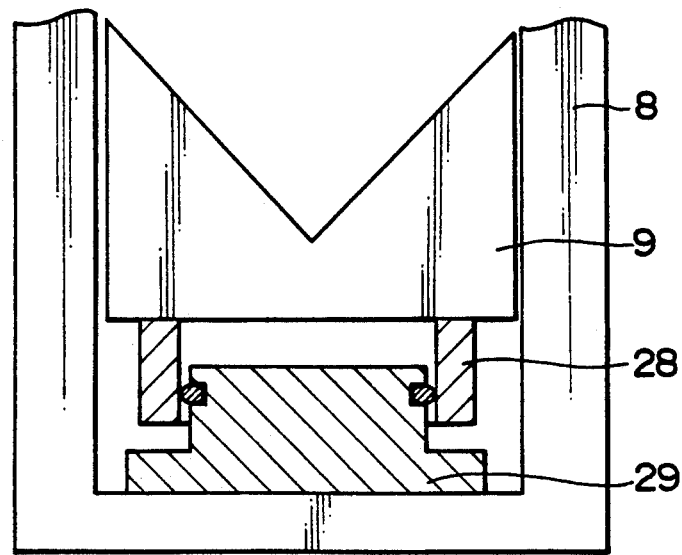
FIG. 4 is a schematic illustration showing in transverse cross section part of a static pressure slide unit which is a modification of the structure shown in FIG. 3.

FIG. 4 illustrated a modification of the structure shown in FIG. 3. That is, the embodiment shown in FIG. 4 also uses a piston and cylinder mechanism as an urging means; however, in this embodiment, a piston 29 is fixedly attached to the slider main body 8 and a cylinder is fixedly attached to the pressure member 9. Thus, when a pressurized fluid is supplied into a chamber defined between the cylinder 28 and the piston 29, the pressure member 9 is urged against the guide rail 1 to establish a desired preloaded condition. As the pressurized fluid, use may be made of either gas, such as air, or liquid, such as oil.

While the above provides a full and complete disclosure of the preferred embodiments of the present invention, various modifications, alternate constructions and equivalents amy be employed without departing from the true spirit and scope of the invention. Therefore, the above description and illustration should not be construed as limiting the scope of the invention, which is defined by the appended claims.

What is claimed is:

1. A static pressure slide unit comprising:
   a guide rail, having a pair of oppositely inclined first and second top surfaces and a pair of oppositely inclined first and second bottom surfaces;
   a two-part slider slidably mounted on said rail and including a slider main body having a pair of oppositely inclined third and fourth top surfaces in sliding contact with the first and second top surfaces of said guide rail, respectively, and a slider pressure member having a pair of oppositely inclined third and fourth bottom surfaces in sliding contact with the first and second bottom surfaces of said guide rail and mounted on said slider main body so as to be movable closer to or away from said guide rail;
   means for constantly urging said slider pressure member against said guide rail; and
   means for supplying a pressurized fluid to a sliding contact interface between said guide rail and said slider.

2. The slide unit of claim 1, wherein said guide rail has a symmetrical cross section with respect to its vertical center line.

3. The slide unit of claim 2, wherein the cross section of said guide rail is also symmetrical in shape with respect to its horizontal center line.

4. The slide unit of claim 3, wherein said guide rail has a cross section in the shape of a rhomboid.

5. The slide unit of claim 3, wherein said guide rail has a square cross section.

6. The slide unit of claim 1, wherein said urging means includes a spring interposed between said slider main body and said slider pressure member.

7. The slide unit of claim 1, wherein said urging means includes a spring and an adjusting member.

8. The slide unit of claim 7, wherein said adjusting member is a screw.

9. The slide unit of claim 1, wherein said urging means includes a piston and a cylinder mechanism interposed between said slider main body and said slider pressure member, whereby a fluid under pressure is supplied to a chamber defined between the cylinder and the piston to thereby cause said pressure member to be urged against said guide rail.

* * * * *